United States Patent
Ichikawa (10) Patent No.: US 7,310,502 B2
(45) Date of Patent: Dec. 18, 2007

(54) RADIO COMMUNICATIONS APPARATUS AND TRANSMISSION POWER CONTROL METHOD THEREOF

(75) Inventor: Yasufumi Ichikawa, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 473 days.

(21) Appl. No.: 09/879,722

(22) Filed: Jun. 12, 2001

(65) Prior Publication Data

US 2002/0013157 A1 Jan. 31, 2002

(30) Foreign Application Priority Data

Jun. 13, 2000 (JP) .................. P. 2000-177029

(51) Int. Cl.
*H01Q 11/12* (2006.01)
(52) U.S. Cl. .................. 455/127.1; 455/127.3
(58) Field of Classification Search ............. 455/39, 455/522, 91, 127.1, 126, 127.3, 552; 375/296, 375/297; 330/279, 129
See application file for complete search history.

(56) References Cited

U.S. PATENT DOCUMENTS 5,926,749 A * 7/1999 Igarashi et al. .......... 455/127.2
5,963,583 A * 10/1999 Davidovici et al. ........ 375/130
6,253,092 B1 * 6/2001 Nguyen et al. ............. 455/522
6,411,825 B1 * 6/2002 Csapo et al. ............... 455/561
2002/0127980 A1 * 9/2002 Amanullah et al. ......... 455/127

FOREIGN PATENT DOCUMENTS

| EP | 0 388 894 | | 6/1990 |
| EP | 0883250 A2 | * | 6/1998 |
| EP | 0 883 250 A2 | | 12/1998 |
| EP | 0883250 A2 | * | 12/1998 |
| JP | 357166711 A | * | 10/1982 |
| WO | WO 97/40584 | * | 10/1997 |

* cited by examiner

*Primary Examiner*—Matthew D. Anderson
*Assistant Examiner*—Angelica M. Perez
(74) *Attorney, Agent, or Firm*—Pearne & Gordon LLP (57) ABSTRACT

Radio communications apparatus according to the invention comprises a DAC, a variable power amplification unit including at least two variable power amplifiers, and variable power amplification control unit for controlling the variable power amplifiers. The variable power amplification control unit controls the variable power amplifiers in order to upgrade the accuracy of the apparatus and assures a smaller apparatus design.

14 Claims, 9 Drawing Sheets

MEMBERSHIP FUNCTION
REGARDING PD

FIG. 5B

MEMBERSHIP FUNCTION
REGARDING PV

FIG. 5C

MEMBERSHIP FUNCTION
REGARDING CONCLUSION

FIG. 6A

CONTROL CHARACTERISTICS OF FIRST VARIABLE POWER AMPLIFIER

FIG. 6B

CONTROL CHARACTERISTICS OF SECOND VARIABLE POWER AMPLIFIER

FIG. 6C

CONTROL CHARACTERISTICS OF VARIABLE POWER AMPLIFICATION UNIT

MEMBERSHIP FUNCTION REGARDING P

TRANSMISSION POWER P [ dBm ]

FIG. 9B

MEMBERSHIP FUNCTION REGARDING V

POWER-SUPPLY VOLTAGE V [ V ]

FIG. 9C

MEMBERSHIP FUNCTION REGARDING CONCLUSION

WEIGHTED COEFFICIENT K

FIG. 10A

CONTROL CHARACTERISTICS OF FIRST VOLTAGE CONTROLLER

FIG. 10B

CONTROL CHARACTERISTICS OF SECOND VOLTAGE CONTROLLER

FIG. 10C

CONTROL CHARACTERISTICS OF VOLTAGE CONTROL UNIT

RADIO COMMUNICATIONS APPARATUS AND TRANSMISSION POWER CONTROL METHOD THEREOF

BACKGROUND OF THE INVENTION

The present invention relates to a transmission power control method and radio communications apparatus effective for control of transmission power in the cellular CDMA (Code Division Multiple Access) system.

In the CDMA system, a single frequency band is shared by a plurality of users. This results in the fact that a signal from another station acts as an interference wave and degrades the circuit quality of a local station. As a technology to solve this problem, transmission power control is used. Particularly, As a transmission power control method for following an interference signal that varies instantaneously, a transmission power control method via closed loop is known.

Figure 12:
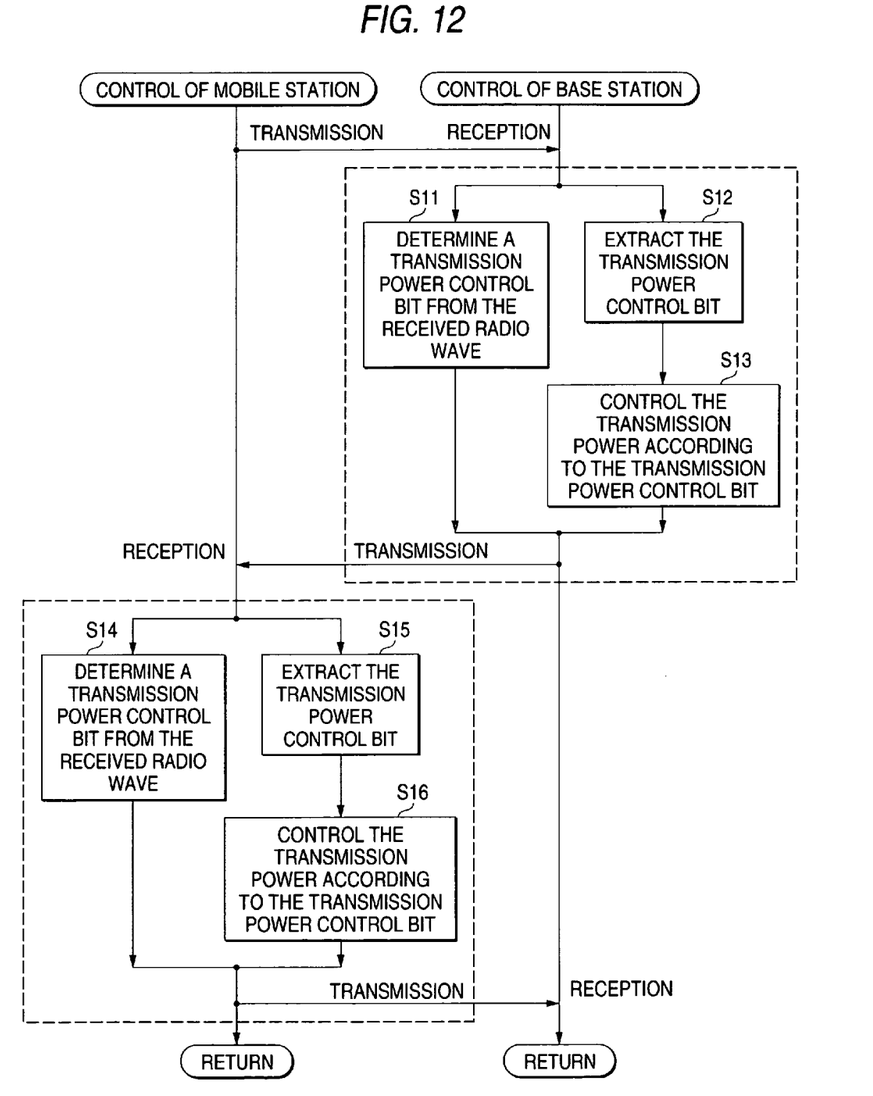
FIG. 12 is a flowchart showing the principle of transmission power control according to the related art.

FIG. 12 shows an example of a conventional transmission power control method via closed loop. As shown in FIG. 12, in case a base station and a mobile station communicates with each other, the base station determines a transmission power bit from a radio wave received from the mobile station (S11), inserts the transmission power control bit in a transmission signal, and transmits the resulting signal to the mobile station. The mobile station receives the signal transmitted from the base station, extracts the transmission power bit (S15) and controls its variable power amplification means according to the instruction of the transmission power control bit (S16).

Similarly, the mobile station determines a transmission power bit from a radio waved received from the base station (S14), inserts the transmission power control bit in the transmission signal, and transmits the resulting signal to the base station. The base station receives the signal transmitted from the mobile station, extracts the transmission power bit (S12) and controls its variable power amplification means according to the instruction of the transmission power control bit (S13).

In case high-accuracy transmission power control is made via an aforementioned conventional transmission power control method, a high-accuracy variable power amplifier is required and high-accuracy control of a variable power amplifier is required. However, an attempt to perform variable power amplification control using a high-accuracy variable power amplifier results in an increased circuit scale and power consumption as well as reduced portability.

SUMMARY OF THE INVENTION

The invention, in view of the problems, aims at providing a transmission power control method whereby the accuracy of transmission power control is upgraded and lower power consumption and a smaller apparatus design are allowed via a simple configuration, and radio communications apparatus that uses the control method.

A transmission power control method according to the first aspect of the invention is a transmission power control method for controlling the power to transmit to the distant party, characterized in that the method comprises variable power amplifying steps (S105, S205) for respectively controlling digital-to-analog conversion means provided in the preliminary stage of a modulator for frequency-converting a transmission signal to a signal in the IF band, the means generating an analog baseband signal to be supplied to the modulator, and a plurality of variable power amplification means for variably amplifying the transmission signal modulated by the modulator.

A transmission power control method according to the second aspect of the invention is characterized in that the variable power amplifying steps modify the control ratio of the variable power amplification means and make series or parallel control in the control range.

A transmission power control method according to the third aspect of the invention is characterized in that the method comprises steps of detecting the state of a local station or a distant station (S102, S202) and steps of modifying the control ratio according to the detected state.

A transmission power control method according to the fourth aspect of the invention is characterized in that the method comprises steps of detecting a plurality of states of a local station or a distant station (S102, S202) and steps of modifying the control ratio by using the fuzzy control rules and fuzzy inference that are based on the plurality of states.

A transmission power control method according to the fifth aspect of the invention is characterized in that the method comprises a step of adaptively modifying the control ratio according to the state of a local station or a distant station.

A transmission power control method according to the sixth aspect of the invention is characterized in that the control sensitivity of each of the plurality of variable power amplification means differs from each other.

A transmission power control method according to the seventh aspect of the invention is a transmission power control method for controlling the power to transmit to the distant party, characterized in that the method comprises voltage control means controlling steps (S104, S204) for controlling a plurality of voltage control means that control a power amplifier for amplifying a transmission signal via separate bias systems.

A transmission power control method according to the eighth aspect of the invention is characterized in that the voltage control means controlling steps modify the control ratio of the voltage control means and make series or parallel control in the control range.

A transmission power control method according to the ninth aspect of the invention is characterized in that the method comprises steps of detecting the state of a local station or a distant station (S102, S202) and steps of modifying the control ratio according to the detected state.

A transmission power control method according to the tenth aspect of the invention is characterized in that the method comprises steps of detecting a plurality of states of a local station or a distant station (S102, S202) and steps of modifying the control ratio by using the fuzzy control rules and fuzzy inference that are based on the plurality of states.

A transmission power control method according to the eleventh aspect of the invention is characterized in that the method comprises a step of adaptively modifying the control ratio according to the state of a local station or a distant station.

A transmission power control method according to the twelfth aspect of the invention is characterized in that the control sensitivity of each of the plurality of variable power amplification means differs with each other.

Radio communications apparatus according to the thirteenth aspect of the invention is radio communications apparatus equipped with the transmission power control feature for controlling the power to be transmitted to the distant station, characterized in that the apparatus comprises variable power amplification means including a digital-toanalog conversion means (DAC 17) provided in the preliminary stage of a modulator (modulator 16) for frequency-converting a transmission signal to a signal in the If band, the means generating an analog baseband signal to be supplied to the modulator and a plurality of variable power amplifiers (variable amplifiers 14, 15) for variably amplifying the transmission signal modulated by the modulator, and variable power amplification control means (variable power amplification control means 18) for controlling the variable power amplification means.

Radio communications apparatus according to the fourteenth aspect of the invention is characterized in that the variable power amplification control means modifies the control ratio of the variable power amplifier and make series or parallel control in the control range.

Radio communications apparatus according to the fifteenth aspect of the invention is characterized in that the apparatus has state detection means (state detection means 23) for detecting the state of a local station or a distant station and modifies the control ratio according to the detected state.

Radio communications apparatus according to the sixteenth aspect of the invention is characterized in that the apparatus modifies the control ratio based on the fuzzy control rules and fuzzy inference.

Radio communications apparatus according to the seventeenth aspect of the invention is characterized in that the apparatus adaptively modifies the control ratio according to the state of a local station or a distant station.

Radio communications apparatus according to the eighteenth aspect of the invention is characterized in that the control sensitivity of each of the plurality of variable power amplification means differs from each other.

Radio communications apparatus according to the nineteenth aspect of the invention is radio communications apparatus equipped with the transmission power control feature for controlling the power to be transmitted to the distant station, characterized in that the apparatus comprises a power amplifier (power amplifier 13) for amplifying a transmission signal, a plurality of voltage control means (first and second voltage control means 19, 20) for controlling the power amplifier via separate bias systems, and control means for controlling voltage control means (control means for controlling voltage control means 21) that controls the voltage control means.

Radio communications apparatus according to the twentieth aspect of the invention is characterized in that the control means for controlling voltage control means modifies the control ratio of the voltage control means and make series or parallel control in the control range.

Radio communications apparatus according to the twenty-first aspect of the invention is characterized in that the apparatus has state detection means (state detection means 23) for detecting the state of a local station or a distant station and modifies the control ratio according to the detected state.

Radio communications apparatus according to the twenty-second aspect of the invention is characterized in that the apparatus modifies the control ratio based on the fuzzy control rules and fuzzy inference.

Radio communications apparatus according to the twenty-third aspect of the invention is characterized in that the apparatus adaptively modifies the control ratio according to the state of a local station or a distant station.

Radio communications apparatus according to the twenty-fourth aspect of the invention is characterized in that the control sensitivity of each of the plurality of variable power amplification means differs from each other.

According to the invention, via a configuration for respectively controlling digital-to-analog conversion means provided in the preliminary stage of a modulator for frequency-converting a transmission signal to a signal in the IF band, the means generating an analog baseband signal to be supplied to the modulator, and a plurality of variable power amplification means for variably amplifying the transmission signal modulated by the modulator, it is possible to upgrade the accuracy of transmit power control and assure lower power consumption and smaller size of apparatus via a simple configuration

DETAILED DESCRIPTION OF THE PREFERRED EMBODIMENTS

Embodiment of the invention will be described referring to the drawings.

Embodiment 1

Figure 1:
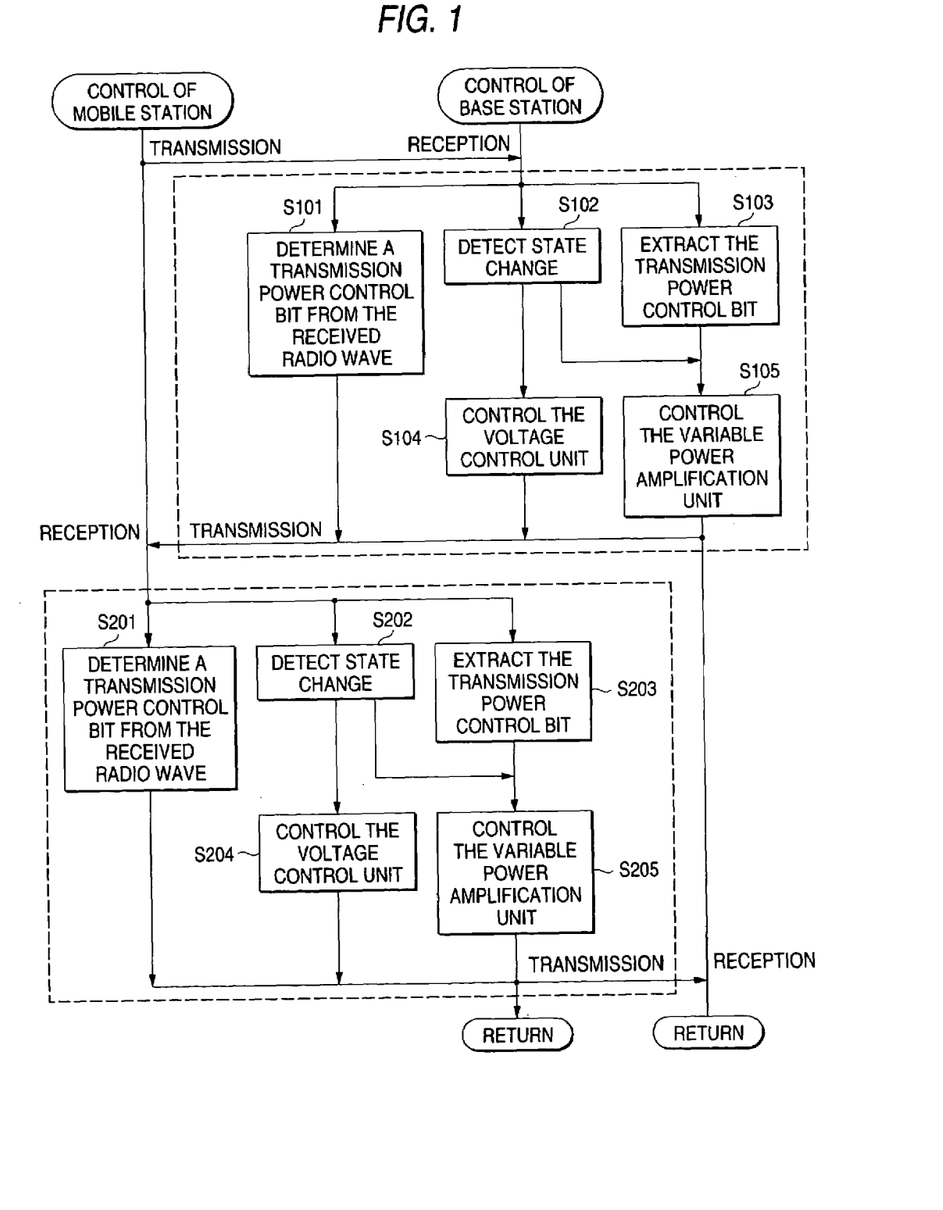
FIG. 1 is a flowchart showing the principle of transmission power control according to first embodiment.

FIG. 1 is a flowchart showing the procedure of the transmission power control method according to first embodiment of the invention. As shown in FIG. 1, in case a base station and a mobile station communicates with each other, the base station determines a transmission power bit from a radio wave received from the mobile station (S101), inserts the transmission power control bit in a transmission signal, and transmits the resulting signal to the mobile station. The mobile station receives the signal transmitted from the base station, extracts the transmission power bit (S203) and controls its variable power amplification unit according to the transmission power control bit and the states of the local station and the distant station detected in Step 202 (S205).

In Step S205, the mobile station can modify the control ratio of the variable power amplification unit according to the states of the local station and the distant station. For example, the mobile station detects the absolute value of transmission power of the local station in Step 202 and increases the control ratio of a former stage variable power amplification unit constituting the variable power amplification unit in proportion to the absolute value of transmission power of the local station in Step S205. In case the variable power amplification unit is an active element, the smaller the input noise is, the more the output noise of the active element suffers from the noise index. Thus, by increasing the control ratio of the former stage variable power amplifier, it is possible to increase the value of transmission power to be input to a subsequent stage variable power amplifier. This approach improves the carrier-to-noise ratio (C/N) over the related art case where the control ratio is fixed.

Figure 2:
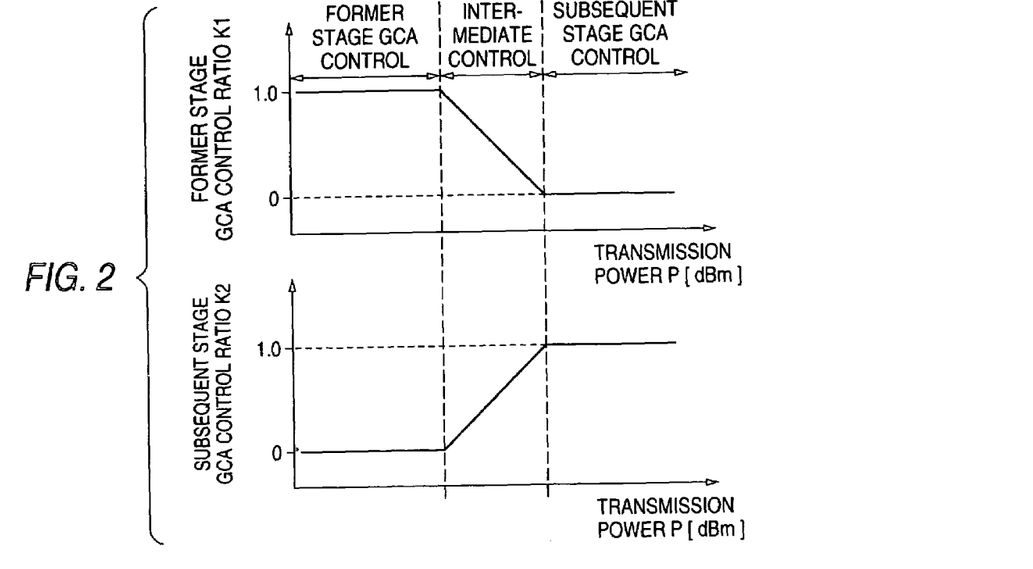
FIG. 2 is a flowchart showing an example of transmission power control according to first embodiment (case 1)

FIG. 2 shows an example of controlling the variable power amplification unit (case 1). The transmission power is represented as P[dBm], the transmission power control volume as PC[dB], the control ratio of the former variable power amplifier (former stage GCA) as K1, the control volume of the former stage variable power amplifier (former stage GCA) in PC1[dB], the control ratio of the subsequent stage variable power amplifier (subsequent stage GCA) as K2 and the control volume of the subsequent stage variable power amplifier (subsequent stage GCA) as PC2[dB]. The control volume of former stage GCA PC1 and the control volume of subsequent stage GCA are represented as follows:

$$PC1 = K1/(K1+K2) \cdot PC$$

$$PC2 = K2/(K1+K2) \cdot PC$$

As shown in FIG. 2, the control ratio of the former stage GCA K1 is increased when the absolute value of transmission power P is small and the control ratio of the subsequent stage GCA K2 is increased when the absolute value of transmission power P is large (series control). In the intermediate control area where control via the former stage GCA is switched over to control via the subsequent stage GCA (parallel control), continuous switch over of control is made possible by arranging so that the sum of the control ratios of the former stage GCA and the subsequent stage GCA may be equal to 1.

In Step 202, the variation volume and the variation velocity of the transmission power of the local station are detected. In Step 205, the greater the variation volume is and the higher the variation velocity of the transmission power of the local station is, the control ratio of the variable power amplifier that has the higher control sensitivity is increased. In Step 205, in case sudden control of the transmission power in the mobile station is desired, the mobile station increases the control ratio of the variable power amplifier that has the higher control sensitivity, and in case gradual control of the transmission power in the mobile station is desired, the mobile station increases the control ratio of the variable power amplifier that has the lower control sensitivity. The variable power amplifier that has the higher control sensitivity provides large control volume and high follow-up ability and the variable power amplifier that has the lower control sensitivity provides small control volume and high control accuracy. Thus, follow-up ability to allow the transmission power following a desired power is improved via transmission power control according to the invention, compared with a case where the control ratio is fixed as in the related art, thereby upgrading the transmission power control accuracy. In Step S202, the mobile station detects the variation volume and the variation velocity of the transmission power of the local station based on the variation volume and the variation velocity of the received power, transmission power and transmission power control bit of the distant station.

Figure 3:
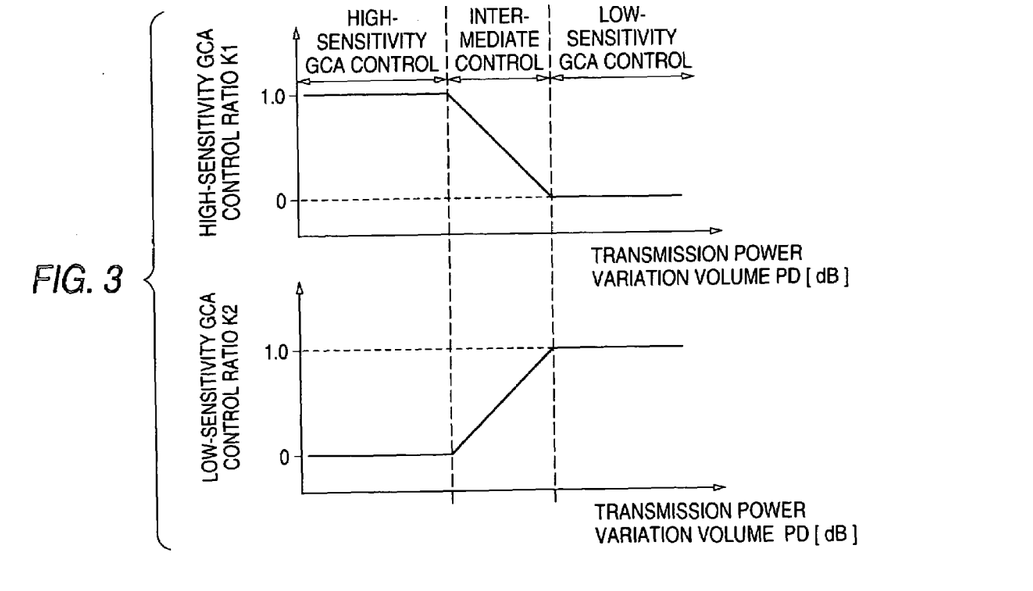
FIG. 3 is a flowchart showing an example of transmission power control according to first embodiment (case 2)

FIG. 3 shows an example of controlling variable power amplification unit (case 2). The transmission power variation volume is represented as PD[dB], the transmission power control volume as PC[dB], the control ratio of a variable power amplifier that has the higher control sensitivity (high-sensitivity GCA) as K1, the control volume of the variable power amplifier that has the higher control sensitivity (high-sensitivity GCA) as PC1[dB], the control ratio of a variable power amplifier that has the lower control sensitivity (low-sensitivity GCA) as K2, and the control volume of the variable power amplifier that has the lower control sensitivity (low-sensitivity GCA) as PC2[dB].

The control volume of high-sensitivity GCA PC1 and the control volume of low-sensitivity GCA PC2 are represented as follows:

$$PC1 = K1/(K1+K2) \cdot PC$$

$$PC2 = K2/(K1+K2) \cdot PC$$

As shown in FIG. 3, the control ratio of the low-sensitivity GCA K2 is increased when the transmission power variation volume PD is small and the control ratio of the high-sensitivity GCA K1 is increased when the transmission power variation volume PD is large (series control). In the intermediate control area where control via the lower-sensitivity GCA is switched over to control via the higher-sensitivity GCA (parallel control), continuous switch over of control is made possible by arranging so that the sum of the control ratios of the preliminary GCA and the secondary GCA may be equal to 1.

Figure 4:
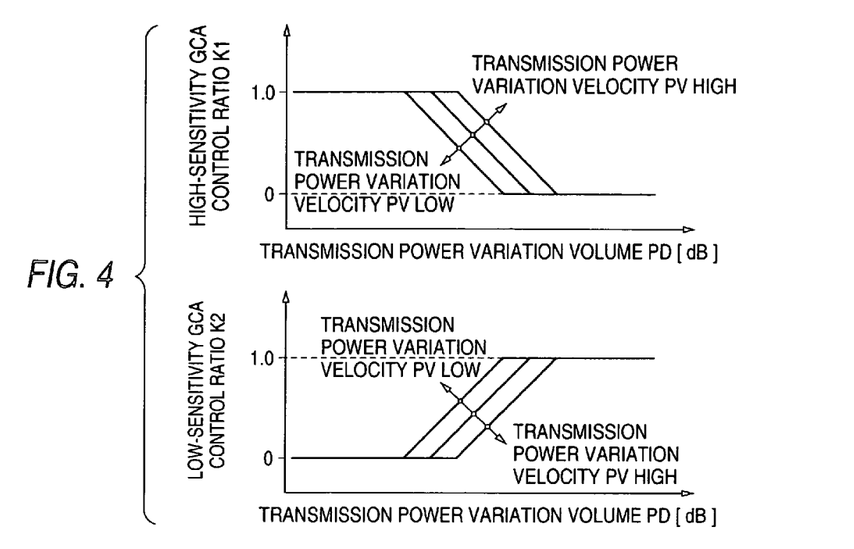
FIG. 4 is a flowchart showing an example of transmission power control according to first embodiment (case 3)

As shown in an example of controlling variable power amplification unit (case 3) in FIG. 4, the variable power amplification unit may be controlled based on the transmission power variation volume and the transmission power variation velocity. In FIG. 4, the transmission power variation velocity is represented as PV[dB/s]. As shown in FIG. 4, the control ratio of the high-sensitivity GCA K1 is increased when the transmission power variation velocity PV is higher, and the control ratio of the lower-sensitivity GCA K2 is increased when the transmission power variation velocity PV is lower.

In Step S205, the mobile station may use the fuzzy inference that is based on the variation volume and variation velocity of the transmission power of the local station to determine the control ratio. Via this approach, it is possible to properly determine the control ratio and upgrade the transmission power control accuracy.

Figure 5A:
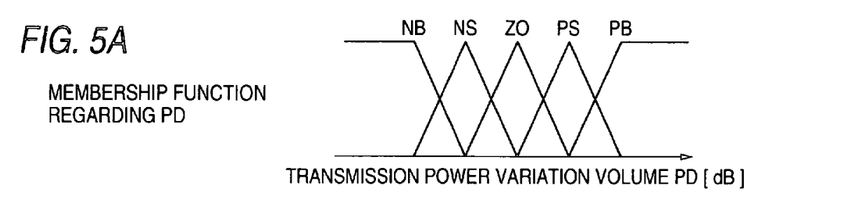
FIG. 5 is a flowchart showing an example of transmission power control according to first embodiment (case 4)
Figure 5B:
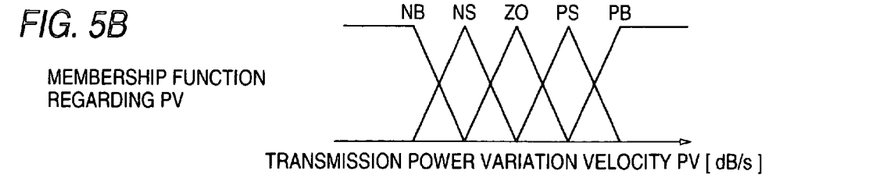

FIG. 5 shows an example of controlling the variable power amplification unit via fuzzy inference (case 4). The transmission power variation volume is represented as PD[dB], the transmission power variation velocity as PV[dB], the transmission power control volume as PC[dB], the control amount of the variable power amplifier that has the higher control sensitivity (high-sensitivity GCA) as PC1[dB], and the control volume of the variable power amplifier that has the lower control sensitivity (low-sensitivity GCA) as PC2[dB]. Fuzzy control rules and fuzzy inference are implemented via the minimax barycenter method. That is, the membership values μPDi (PD) and μPVi (PV) of the current transmission power variation volume PD and the transmission power variation velocity PV are calculated from FIGS. 5A and B respectively for each control rule and the smaller value of the membership values is determined as the condition satisfying degree Wi of each control rule. Note that i represents the rule i of Table 1 and any of the integers 1 through 25 in this embodiment.

TABLE 1

Fuzzy Control Rules

|  |  | transmission power variation amount PD | | | | |
|---|---|---|---|---|---|---|
|  |  | NB | NS | ZO | PS | PB |
| transmission power variation velocity PV | NB | CNB | CNB | CNB | CNB | CZO |
|  | NS | CNB | CNB | CNB | CZO | CPB |
|  | ZO | CNB | CNB | CZO | CPB | CPB |
|  | PS | CNB | CZO | CPB | CPB | CPB |
|  | PB | CZO | CPB | CNB | CPB | CPB |

Figure 5C:
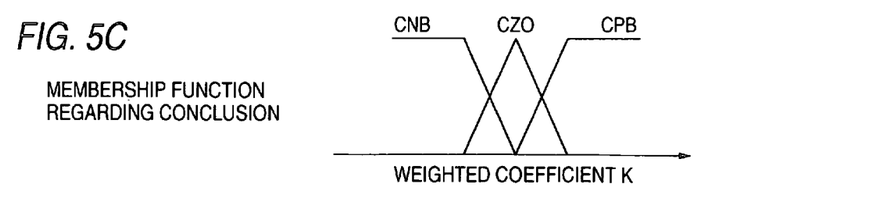

Next, the conclusion membership function μKi (K) of each control rule shown in FIG. 5C is multiplied by the condition satisfying degree Wi and after the conclusion membership function is corrected, the logical add function μK* (K) of the conclusion membership function is calculated.

$$\mu K^*(K) = \mu K1^*(K) \ U \ \mu K2^*(K) \ U \ldots U \ \mu K25^*(K)$$

where $$\mu Ki^*(K) = Wi \cdot \mu Ki(K) \ (i=1-25)$$

Next, the barycenter of the logical add function μK* (K) is obtained as the weighted coefficient K* via fuzzy inference.

$$K^* = \int K \cdot \mu Ki^*(K) dK / \int \mu Ki^*(K) dK$$

In Step S205, the mobile station adaptively modifies the control ratio of the variable power amplification unit according to the states of the local station and the distant station detected in Step 202. In Step S205, the mobile station can adaptively correct the control ratio of the variable power amplification unit according to the temperature of the local station, power-supply voltage, transmission frequency, diffusion ratio of a transmission signal, code multiplicity of a transmission signal, and peak value of the transmission signal. Thus, by adaptively controlling the control ratio so that a constant transmission power may be obtained irrespective of variations in the temperature of the local station, power-supply voltage, sending frequency, diffusion ratio of a transmission signal, code multiplicity of a transmission signal, and peak value of the transmission signal, the output accuracy of the transmission power is upgraded compared with a case where the control ratio is not corrected as in related art applications, thereby upgrading the transmission power control accuracy.

Further, in Step S205, the mobile station can adaptively correct the transmission power according to environmental changes. Accordingly, it is possible to correct the transmission power according to the environmental changes without modifying apparatus for a new factor of environmental changes. This leads to a simplified apparatus design and lower power consumption. In order to adaptively correct a baseband signal and control signals of variable power amplification unit and power amplifiers as the adaptive control of transmission power, the coefficient of a digital filter provided in the preliminary stage of the digital-to-analog converter (DAC) for generating these signals is modified.

In Step S205, the mobile station controls a plurality of variable power amplifiers having different control sensitivities. In Step 205, the mobile station can set the control ratios of the variable power amplifiers having different control sensitivities to proper values in order to upgrade the linearity of the control characteristics, thus upgrading the transmission power control accuracy.

Figure 6A:
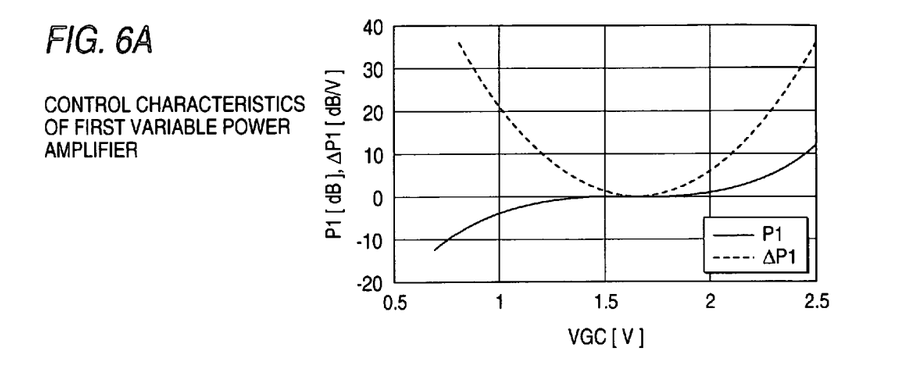
FIG. 6 is a flowchart showing an example of transmission power control according to first embodiment (case 5)
Figure 6B:
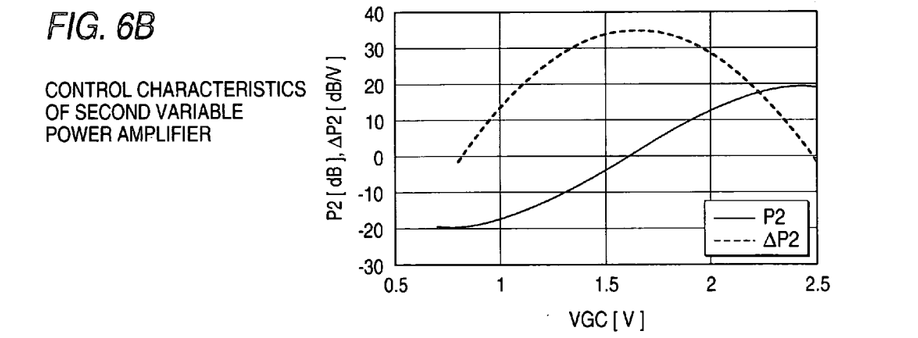
Figure 6C:
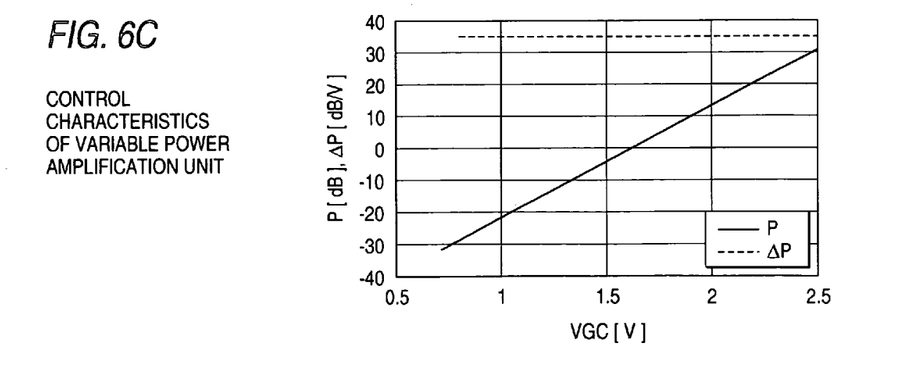

FIG. 6 shows an example of controlling variable power amplification unit (case 5). The output power is represented as P, the control sensitivity as AP, the control voltage as VGC, the output power of the first variable power amplifier as P1, the control sensitivity of the first variable power amplifier as ΔP1, the output power of the second variable power amplifier as P2, and the control sensitivity of the second variable power amplifier as ΔP2. As shown in FIGS. 6A-6C, among the control characteristics of the first variable power amplifier (FIG. 6A), the output power P1 has a substantially linear characteristic except where the control voltage VGC falls within the range of 1 to 2[V]. Among the control characteristics of the second variable power amplifier (FIG. 6B), the output power P2 has a substantially linear characteristic where the control voltage VGC falls within the range of 1 to 2[V]. Thus, by selecting the first variable power amplifier where the control voltage is below 1[V] and above 2[V] and selecting the second variable power amplifier where the control voltage is within the range of 1[V] to 2[V], a linear characteristic is obtained via the first and the second variable power amplifiers (FIG. 6C).

Next, the mobile station inserts the transmission power control bit determined in Step 201 in a transmission signal and transmits the resulting signal to the base station. The base station receives the signal transmitted from the mobile station, extracts the transmission power bit (S103) and controls its variable power amplification unit according to the states of the local station and the distant station detected in Step S102 (S105). Processing in Steps S102, S105 is the same as that in Steps in S202, S205, thus upgrading the transmission power control accuracy and allowing a simplified apparatus design and lower power consumption.

While the foregoing description covers transmission power control, it is also applicable to received power control.

Embodiment 2

FIG. 1 is a flowchart showing the procedure of the transmission power control method according to second embodiment of the invention. As shown in FIG. 1, in case a base station and a mobile station communicates with each other, the base station determines a transmission power bit from a radio wave received from the mobile station (S101), inserts the transmission power control bit in a transmission signal, and transmits the resulting signal to the mobile station. The mobile station receives the signal transmitted from the base station, extracts the transmission power bit (S203) and controls its variable power amplification unit according to the transmission power control bit and the states of the local station and the distant station detected in Step 202 (S204).

In Step S204, the mobile station can modify the control ratio of voltage control unit according to the states of the local station and the distant station. For example, the mobile station detects the absolute value and the power-supply voltage of transmission power of the local station in Step 202. The mobile station increases the control ratio of voltage control unit for correcting the collector voltage of the power amplifier in proportion to the absolute value of transmission power of the local station and the power-supply voltage in Step 204. This enhances the efficiency and stability of the power amplifier, thus reducing the power consumption and upgrading the transmission power control accuracy, compared with a case where the control ratio is fixed as in related art applications. In case bias control is made on the power amplifier, the collector voltage or base voltage is controlled for reducing a consumption current. However, in case bias control is dedicated to control of the collector voltage or base voltage, variation in the transmission power or power-supply voltage invites various characteristics such as increased co-channel leak power, lower stability and reduced gain. In case the transmission power varies in a wide range such as in the CDMA system, fixing the bias voltage results in a noticeable difference between characteristics at the upper limit and the lower limit of the transmission power. By modifying the control ratio of the collector voltage control and the base voltage control according to variations in the transmission power as in this embodiment, it is possible to obtain stable characteristics over the entire range of the transmission power.

Figure 7:
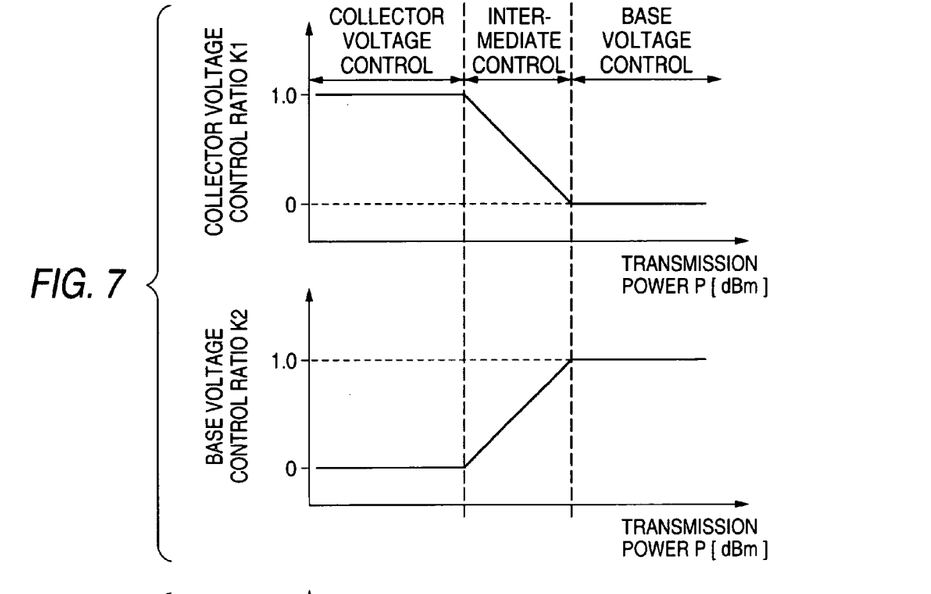
FIG. 7 is a flowchart showing an example of transmission power control according to second embodiment (case 1)

FIG. 7 shows an example of a controlling voltage control unit (case 1). The transmission power is represented as P[dB], the voltage control volume as VC[dB], a control ratio of a voltage controller for controlling the collector voltage as K1, a control volume of the voltage controller for controlling a collector voltage as VC1[dB], a control ratio of a voltage controller for controlling the base voltage as K2, and the control volume of a voltage controller for controlling a base voltage as VC2[dB].

The control volume for controlling the collector voltage VC1 and the control volume for controlling the base voltage VC2 are represented as follows:

$$VC1 = K1/(K1+K2) \cdot VC$$

$$VC2 = K2/(K1+K2) \cdot VC$$

As shown in FIG. 7, the control ratio of the voltage controller for controlling the collector voltage is increased when the absolute value of transmission power is small and the control ratio of the voltage controller for controlling the base voltage is increased when the absolute value of transmission power is large (series control). In the intermediate control area where collector voltage control is switched over to base voltage control (parallel control), continuous switch over of control is made possible by arranging so that the sum of the control ratios of collector voltage control and base voltage control may be equal to 1. In general, the collector voltage is generated by a DC/DC converter. Thus, FIG. 7 shows a control example where the usage ratio of the converter can be reduced when the consumption current is larger.

Figure 8:
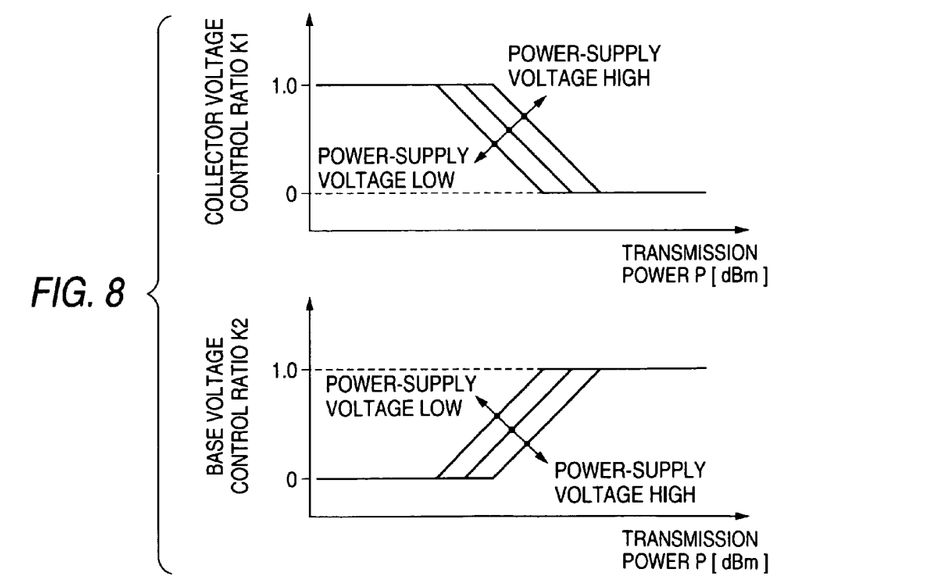
FIG. 8 is a flowchart showing an example of transmission power control according to second embodiment (case 2)

As in the example of controlling voltage control unit (case 2) shown in FIG. 8, the voltage control unit may be controlled based on the absolute value of transmission power and the power-supply voltage. In FIG. 8, the power-supply voltage is represented as V[V]. As shown in FIG. 8, the control ratio of the voltage controller for controlling the collector voltage is increased when the power-supply voltage is higher and the control ratio of the voltage controller for controlling the base voltage is increased when the power-supply voltage is smaller. In general, the smaller the difference between the collector voltage and the base voltage of a power amplifier is, the less stable the power amplifier becomes. Thus, FIG. 8 shows a control example where the collector voltage can be increased.

In Step S204, the mobile station may determine the control ratio by using fuzzy inference that is based on the absolute value of transmission power and the power-supply voltage of the local station detected in Step S202. Via this approach, it is possible to properly determine the control ratio, thus reducing the power consumption and upgrading the transmission power control accuracy.

Figure 9A:
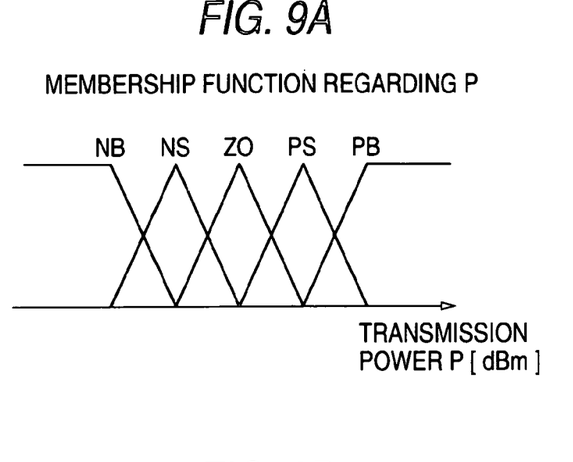
FIG. 9 is a flowchart showing an example of transmission power control according to second embodiment (case 3)
Figure 9B:
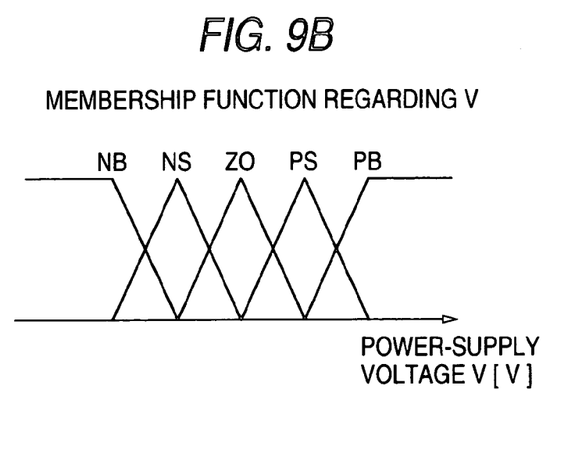
Figure 9C:
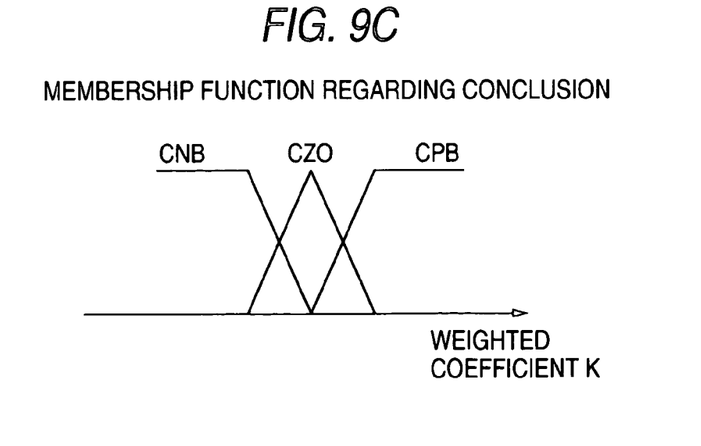

FIGS. 9A-9C shows an example of controlling voltage control unit (case 3). The transmission power is represented as P[dB], the power-supply voltage as V[V], the voltage control volume as VC[dB], the control ratio of the voltage controller for controlling the collector voltage as Ki, the control volume of the voltage controller for controlling the collector voltage as VC1[dB], the control ratio of the voltage controller for controlling the base voltage as K2, and the control volume of the voltage controller for controlling the base voltage as VC2[dB]. Fuzzy control rules and fuzzy inference are implemented via the minimax barycenter method. That is, the membership values μPDi(P) and μVi(V) of the current transmission power P and the power-supply voltage V are calculated from FIGS. 9A and 9B respectively for each control rule and the smaller value of the membership values is determined as the condition satisfying degree Wi of each control rule. Note that i represents the rule i of Table 2 and any of the integers 1 through 25 in this embodiment.

TABLE 2

Fuzzy Control Rules

| | | transmission power P | | | | |
|---|---|---|---|---|---|---|
| | | NB | NS | ZO | PS | PB |
| power-supply | NB | CNB | CNB | CNB | CNB | CZO |
| voltage V | NS | CNB | CNB | CNB | CZO | CPB |
| | ZO | CNB | CNB | CZO | CPB | CPB |
| | PS | CNB | CZO | CPB | CPB | CPB |
| | PB | CZO | CPB | CNB | CPB | CPB |

Next, the conclusion membership function μK1(K) of each control rule shown in FIG. 9 (c) is multiplied by the condition satisfying degree wi and after the conclusion membership function is corrected, the logical add function μK*(K) of the conclusion membership function is calculated.

$$\mu K^*(K) = \mu K1^*(K) \cup \mu K2^*(K) \cup \ldots \cup \mu K25^*(K)$$

where $$\mu Ki^*(K) = Wi \cdot \mu Ki(K) \quad (i=1-25)$$

Next, the weight center of the logical add function μK*(K) is obtained as the weighted coefficient K* via fuzzy inference.

$$K^* = \int K \cdot \mu Ki^*(K) dK / \int \mu Ki^*(K) dK$$

In Step S204, the mobile station adaptively modifies the control ratio of the voltage control unit according to the states of the local station and the distant station detected in Step 202. In Step S204, the mobile station can adaptively correct the control ratio of the voltage control unit according to the temperature of the local station, power-supply voltage, transmission frequency, diffusion ratio of a transmission signal, code multiplicity of a transmission signal, and peak value of the transmission signal. Thus, by adaptively controlling the control ratio so that a constant transmission power may be obtained irrespective of variations in the temperature of the local station, power-supply voltage, transmission frequency, diffusion ratio of a transmission signal, code multiplicity of a transmission signal, and peak value of the transmission signal, the output accuracy of the transmission power is upgraded compared with a case where the control ratio is not corrected as in related art applications, thereby upgrading the transmission power control accuracy.

In Step S204, the mobile station can adaptively correct the transmission power according to environmental changes. Accordingly, it is possible to correct the transmission power according to the environmental changes without modifying apparatus for a new factor of environmental changes. This leads to a simplified apparatus design and lower power consumption. In order to adaptively correct a baseband signal and control signals of variable power amplification unit and power amplifiers as the adaptive control of transmission power, the coefficient of a digital filter provided in the former stage of the digital-to-analog converter (DAC) for generating these signals is modified.

In Step S204, the mobile station controls a plurality of voltage controllers having different control sensitivities. In Step 204, the mobile station can set the control ratios of the voltage controllers having different control sensitivities to proper values in order to upgrade the linearity of the control characteristics, thus upgrading the transmission power control accuracy.

Figure 10A:
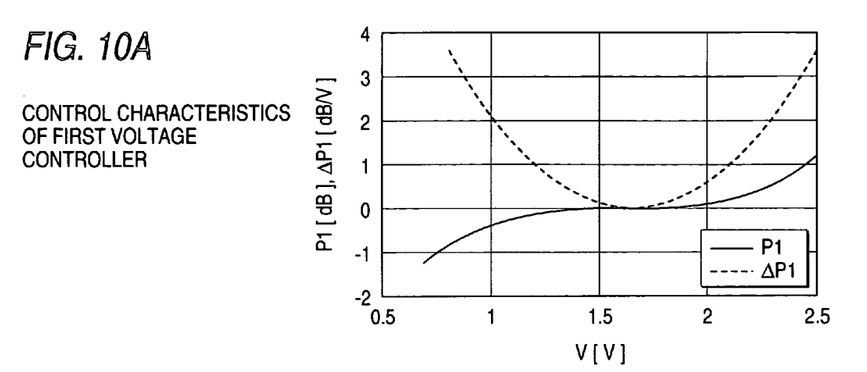
FIG. 10 is a flowchart showing an example of transmission power control according to second embodiment (case 4)
Figure 10B:
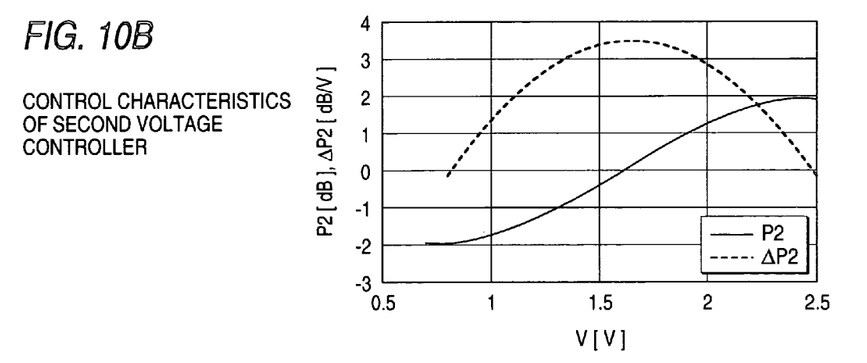
Figure 10C:
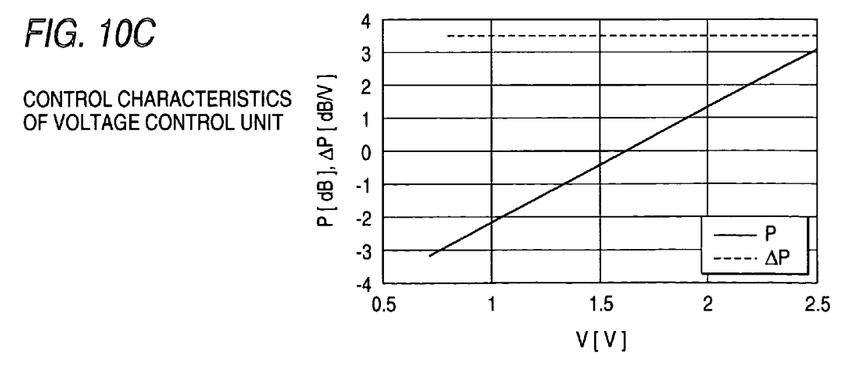

FIG. 10 shows an example of controlling voltage control unit (case 4). The output voltage is represented as P, the control sensitivity as AP, the power-supply voltage as V, the output voltage of the first voltage controller as P1, the control sensitivity of the first voltage controller as $\Delta P1$, the output voltage of the second voltage controller as P2, and the control sensitivity of the second voltage controller as $\Delta P2$. As shown in FIGS. 10A-10B, among the control characteristics of the first voltage controller (FIG. 10A), the output voltage P1 has a substantially linear characteristic except where the power-supply voltage V falls within the range of 1 to 2[V]. Among the control characteristics of the second voltage controller (FIG. 10B), the output voltage P2 has a substantially linear characteristic where the power-supply voltage V falls within the range of 1 to 2[V]. Thus, by selecting the first voltage controller where the power-supply voltage is below 1[V] and above 2[V] and selecting the second voltage controller where the power-supply voltage is within the range of 1[V] to 2[V], a linear characteristic is obtained via the first and the second voltage controllers (FIG. 10C).

Next, the mobile station inserts the transmission power control bit determined in Step 201 in a transmission signal and transmits the resulting signal to the base station. The base station receives the signal transmitted from the mobile station, extracts the transmission power bit (S103) and controls its variable power amplification unit according to the states of the local station and the distant station detected in Step S102 (S104). Processing in Steps S102, S104 is the same as that in Steps in S202, S204, thus upgrading the transmission power control accuracy and allowing a simplified apparatus design and lower power consumption.

While the foregoing description covers transmission power control, it is also applicable to received power control.

Embodiment 3

Figure 11:
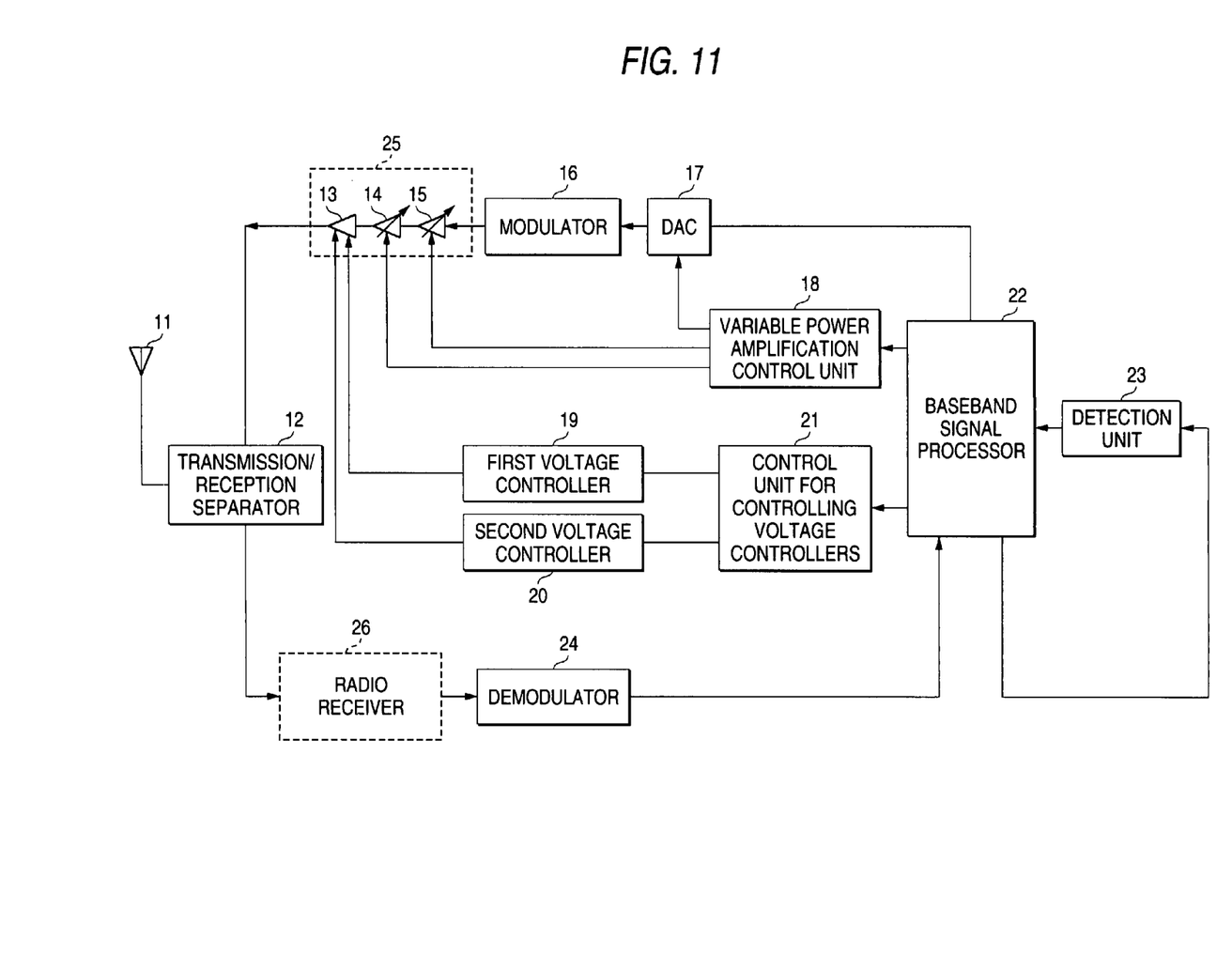
FIG. 11 is a block diagram showing an example of radio communications apparatus according to third embodiment of the invention.

FIG. 11 is a block diagram showing an embodiment of radio communications apparatus according to the invention. In FIG. 11, the numeral 11 represents an antenna, 12 a transmit/receive separator, 13 a power amplifier, 14 a first variable power amplifier, 15 a second variable power amplifier, 16 a modulator, 17 a digital-to-analog converter (DAC), 18 variable power amplification control unit, 19 first voltage controller, 20 second voltage controller, 21 control unit for controlling voltage controllers, 11 a baseband signal processor, 23 state detection unit, 24 a demodulator, 25 a radio transmitter, and 26 a radio receiver.

In case the radio communications apparatus shown in FIG. 11, the baseband signal processor 22 determines a transmission power bit received from the base station and inserts the transmission power control bit in a transmission signal. The transmit signal is converted to an analog signal by the DAC 17, frequency-converted to a signal in the IF band by the modulator 16, converted to a signal in the RD band by the radio transmitter 25, then sent to the base station from the antenna 11 via the transmit/receive separator 12.

The signal transmitted from the mobile station is received by the antenna 11. The received signal is input to the radio receiver 26 via the transmit/receive separator 12. The radio signal is frequency-converted to a signal in the IF band by the radio receiver 26 and converted to a baseband signal by the demodulator 24.

The baseband signal processor 22 extracts a transmission power control bit from the baseband signal output from the demodulator 24. The state detection unit 23 detects the states of the base station and the local station based on the variation volume and the variation velocity of the receiving power, transmission power and transmission power control bit of the base station and the local station, the variation volume and the variation velocity output from the baseband signal processor 22.

The variable power amplification control unit 18 controls the first and the second variable power amplifiers 14, 15 and DAC 17 according to the extracted transmission power control bit and the detected states. The variable power amplification control unit 18 controls the first and the second variable power amplifiers 14, 15 based on the transmission power control shown in the first embodiment. The variable power amplification control unit 18 controls the gain of the DAC 17 to arrange the dynamic range and linearity of the baseband signal obtained before modulation.

The control unit for controlling voltage controllers 21 controls the first and the second voltage controllers 19 and 20. The control unit for controlling voltage controllers 21 controls the first and the second voltage controllers 19 and, 20 based on the transmission power control shown in second embodiment.

Thus, accuracy of follow-up ability of the transmission power to a desired power is improved by the radio communications apparatus according to the embodiments of the invention, thus upgrading the transmission power control accuracy. This also minimizes the necessary transmission power and assures lower power consumption and smaller size of apparatus.

As mentioned earlier, accuracy of follow-up ability of the transmission power to a desired power is improved by the invention, thus upgrading the transmission power control accuracy. This also minimizes the necessary transmission power and assures lower power consumption and smaller size of apparatus.

What is claimed is:

1. A transmission power control method for controlling the power to transmit to a distant party, comprising the steps of:

controlling an adjustable digital-to-analog converter for generating an analog baseband signal to be input to a modulator for frequency-converting a transmission signal to a signal in an IF band;

controlling first and second variable power amplifiers, connected in series with each other, for variably amplifying the transmission signal modulated by the modulator;

a detection step of detecting a state of at least one of a local station and a distant station; and a modification step of modifying control ratios of the first and the second variable power amplifiers according to the detected state;

wherein at least one of series and parallel control in a control range is made in the controlling the first and second variable power amplifiers step, and wherein, in the series control, the control ratio of the first variable amplifier is set to 1 and the control ratio of the second variable amplifier is set to 0, and wherein, in the parallel control, a sum of the control ratios of the first and second variable amplifiers is set to 1.

2. A transmission power control method according to claim 1, wherein a plurality of states of at least one of the local station and the destination station are detected in the detection step, and wherein the control ratios are modified by using fuzzy control rules and fuzzy inference that are based on the plurality of states in the modification step.

3. A transmission power control method according to claim 1, wherein the control ratios according to the state of at least one of the local station and the distant station is adaptively modified in the modification step.

4. A transmission power control method according to claim 1, wherein a control sensitivity of each of the first and second variable power amplifiers differs from each other.

5. A transmission power control method for controlling a power to transmit to a distant party, comprising the steps of:
controlling first and second voltage controllers;
controlling, using said first and second voltage controllers, a power amplifier for amplifying a transmission signal;
the first voltage controller controlling a collector voltage of the power amplifier, the second voltage controller controlling a base voltage of the power amplifier;
a detection step of detecting a state of at least one of a local station and a distant station; and
a modification step of modifying control ratios of the first and the second voltage controllers according to the detected state;
wherein at least one of series and parallel control in a control range is made in the voltage controller controlling step, wherein, in the series control, the control ratio of one of the voltage amplifiers controllers is set to 1 and the control ratio of the other is set 0, and wherein, in the parallel control, a sum of the control ratios of the first and second voltage controllers is set to 1.

6. A transmission power control method according to claim 5, wherein a plurality of states of at least one of the local station and the destination station are detected in the detection step, and wherein the control ratios are modified by using fuzzy control rules and fuzzy inference that are based on the plurality of states in the modification step.

7. A transmission power control method according to claim 5, wherein the control ratios according to the state of at least one of a local station and a distant station are adaptively modified in the modification step.

8. A radio communication apparatus comprising:
a first variable power amplifier;
a second variable power amplifier connected in series with said first variable power amplifier;
an adjustable digital-to-analog converter;
a modulator;
means for controlling the adjustable digital-to-analog converter for generating an analog baseband signal to be input to the modulator for frequency-converting a transmission signal to a signal in an IF band;
means for controlling first and second variable power amplifiers for variably amplifying the transmission signal modulated by the modulator;
a detection unit for detecting a state of at least one of a local station and a distant station; and
means for modifying control ratios of the first and the second variable power amplifiers according to the detected state,
wherein at least one of series and parallel control in a control range is utilized by the means for controlling the first and second variable power amplifiers, and wherein, in the series control, the control ratio of the first variable amplifier is set to 1 and the control ratio of the second variable amplifier is set to 0, and wherein, in the parallel control, a sum of the control ratios of the first and second variable amplifiers is set to 1.

9. The apparatus of claim 8, wherein a plurality of states of at least one of the local station and the destination station are detected by the detection unit, and wherein the control ratios are modified by using fuzzy control rules and fuzzy inference that are based on the plurality of states in the means for modifying.

10. The apparatus of claim 8, wherein the control ratios according to the state of at least one of the local station and the distant station is adaptively modified in the means for modifying.

11. The apparatus of claim 8, wherein a control sensitivity of each of the first and second variable power amplifiers differs from each other.

12. A radio communication apparatus comprising:
a first voltage controller;
a second voltage controller;
means for controlling said first and said second voltage controllers;
a power amplifier for amplifying a transmission signal;
means for controlling, using said first and second voltage controllers, said power amplifier, wherein the first voltage controller controls a collector voltage of the power amplifier and the second voltage controller controls a base voltage of the power amplifier;
a detection unit for detecting a state of at least one of a local station and a distant station; and
means for modifying control ratios of the first and the second voltage controllers according to the detected state;
wherein at least one of series and parallel control in a control range is made in the means for controlling said first and said second voltage controllers, wherein, in the series control, the control ratio of one of the voltage controllers is set to 1 and the control ratio of the other is set 0, and wherein, in the parallel control, a sum of the control ratios of the first and second voltage controllers is set to 1.

13. The apparatus of claim 12, wherein a plurality of states of at least one of the local station and the destination station are detected by the detection unit, and wherein the control ratios are modified by using fuzzy control rules and fuzzy inference that are made based on the plurality of states by the means for modifying.

14. The apparatus of claim 12, wherein the control ratios according to the state of at least one of a local station and a distant station are adaptively modified by the means for modifying.

* * * * *